(12) United States Patent
Faigen et al.

(10) Patent No.: US 7,067,100 B2
(45) Date of Patent: Jun. 27, 2006

(54) LIQUID FERRIC SULFATE MANUFACTURING PROCESS

(75) Inventors: Steven Faigen, Jamesville, NY (US); Joseph Hurd, Sandy Creek, NY (US); Larry Knuth, Celina, TX (US)

(73) Assignee: General Chemical Corporation, Parsippany, NJ (US)

( * ) Notice: Subject to any disclaimer, the term of this patent is extended or adjusted under 35 U.S.C. 154(b) by 496 days.

(21) Appl. No.: 10/387,307

(22) Filed: Mar. 12, 2003

(65) Prior Publication Data

US 2004/0179992 A1 Sep. 16, 2004

(51) Int. Cl.
*C01G 49/14* (2006.01)

(52) U.S. Cl. ............. 423/558; 423/146; 423/DIG. 2

(58) Field of Classification Search .............. 423/558, 423/146, DIG. 2
See application file for complete search history.

(56) References Cited

U.S. PATENT DOCUMENTS

| 2,252,332 A | | 8/1941 | Plumer | |
| 3,503,946 A | * | 3/1970 | Scanley et al. | 525/382 |
| 3,719,748 A | * | 3/1973 | Manfroy et al. | 423/544 |
| 4,814,158 A | | 3/1989 | Everill | |

FOREIGN PATENT DOCUMENTS

JP 61-215222 * 9/1986

OTHER PUBLICATIONS

Perry's Chemical Engineers' Handbook, Seventh Edition (1997), McGraw-Hill, ISBN 0-07-049841-5: Section 18, "Liquid-Solid Operations and Equipment": Table of Contents at pp. 18-1-18-4, and pp. 18-74-18-77 of section entitled "Filtration".*

* cited by examiner

*Primary Examiner*—Stanley S. Silverman
*Assistant Examiner*—Ardith E Hertzog
(74) *Attorney, Agent, or Firm*—Arthur J. Plantamura

(57) ABSTRACT

A process for the production of liquid ferric sulfate from finely-divided ferric oxide, sulfuric acid and water in a closed reaction vessel at temperatures ranging from about 130.degree. C. to about 150.degree. C. and pressures from about 30 psi to about 70 psi. The reaction time ranges from Four to eight hours and produces liquid ferric sulfate having at least 10% trivalent iron. Yield and efficiency are provided by controlling the specific gravity prior to the reaction and by counter current cycling the waste stream from the reaction through the dilution water and use of a polymeric settling agent to remove unreacted iron content from the digester output.

10 Claims, 1 Drawing Sheet

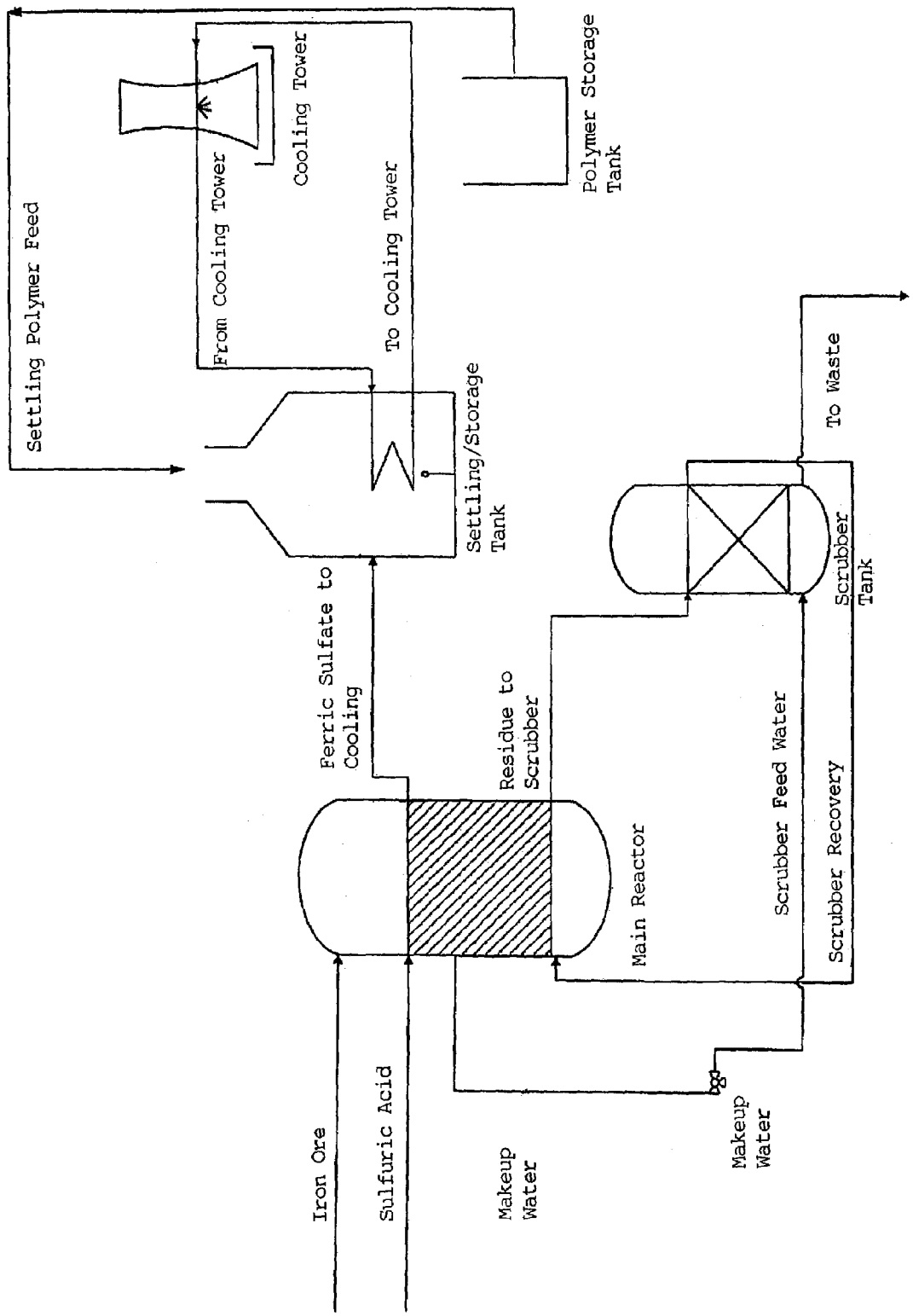

LIQUID FERRIC SULFATE MANUFACTURING PROCESS

BACKGROUND OF THE INVENTION

1. Field of the Invention

This invention relates to an improved process for making liquid ferric sulfate. More particularly, the invention relates to a method that affords better control and efficiency in the digestion process for producing liquid ferric sulfate from finely-divided iron ore, sulfuric acid and water.

2. Description of the Prior Art

Ferric sulfate is a known product. It is commonly used in portable water and sewage treatment processes. These purification processes involve using ferric sulfate as a flocculent to remove suspended particles in the water.

Ferric sulfate has been produced from a variety of materials under different conditions. In the past, it has been commercially produced by reacting flue dust with sulfuric acid in a batch process. U.S. Pat. No. 2,252,332, issued to Plummer, describes such a process for making dry ferric sulfate.

As disclosed in Plummer, the flue dust was a waste product of a smelter and has less than 60% total iron content. The reaction between the flue dust and ferric sulfate was exothermic and drove off the water from the reaction. The resultant product was a solid mass, which usually took the form of fines, granules and large clumps.

Typically, a water treatment facility will purchase the dry ferric sulfate in bulk and store it in a silo until it is pneumatically transferred to the treatment tank. However, several problems are encountered in the use of dry ferric sulfate. One of the major problems is simply the transportation of the powder. It has a tendency to be hygroscopic and will frequently cake during storage.

Still another problem is that the dry ferric sulfate contains impurities from the initial feed stock of flue dust. These impurities are not removed during the sulfonation process so they form part of the solid mass that is produced. When the dry ferric sulfate is solubilized in the treatment water, these insoluble impurities precipitate as sludge. The total weight of the insoluble material could be as much as about 10% of the dry ferric sulfate. In addition to having to dispose of this sludge, the user also pays for material, which does not perform any useful function.

Consequently, there is still a need in the industry for a coagulant that can be easily transported through pipes and valves without clogging and which does not introduce extraneous material into the water treatment process.

SUMMARY OF THE INVENTION

The present invention relates to a process for the manufacture of liquid ferric sulfate from finely-divided iron ore, sulfuric acid and water in a closed pressure vessel under superatmospheric conditions. In the preferred embodiment of this invention, the iron ore contains at least—93% and preferably about 95% to about 98% total iron by weight, and employs a sulfuric acid that is at least about 90% and preferably about 93% to about 98% pure. The reaction is maintained at a temperature of at least 125° C. and at a pressure at least about 30 psi for periods of from about 3 to 8 hours and preferably at a temperature of about 140 for about 4–6 hours.

In accordance with the invention, the product throughput of the process is increased and the quality of the final product is improved by the addition of a small but effective amount of a polymeric settling aid. Any variety of suitable polymeric materials may be used. Cationic polymers as a class are desirable and most preferably is cationic polyacryamide. We have also discovered that the yield is marked by improved hydroversing a portion of the reactor heel to a tank ("Scrubber") with water for the following batch being passed through this heel on the way to the reactor. This has the beneficial effects of improving overall yield from the iron ore and minimizes the environmental impact of unreacted material by keeping it to a minimum. Substantially consistent results have been found to be obtainable, even with variations in one quality and scrubber recovery by monitoring and adjusting the specific gravity of the reactants.

The process is preferably conducted batchwise wherein a predetermined quantity of water, the finely-divided iron ore and the concentrated sulfuric acid are placed in a closed vessel. The contents are agitated and the mixture heated to a temperature of about 140° C. at a pressure of about 35 psi by applying heat from an external source such as from a boiler. The heating of the reacting mixture is controlled so as to prevent a runaway reaction; with a gradual rise in temperature preferably at a rate of about 5 degrees C. every fifteen minutes.

Once the reaction temperature and pressure are reached, the external heat source is shut down because the digestion process is exothermic and will produce sufficient heat to maintain the reaction temperature. The temperature of the reaction is preferably maintained in the range of from about 130.degree. C. to about 150.degree. C. during the digestion process, which typically lasts from 4 to 8 hours at reaction temperature and pressure.

When the digestion process is complete, the pressure is slowly released, and the temperature allowed to decline. With expedited lowering of the temperature recommended. The lowering of the temperature should be expedited to prevent hydration of the ferric sulfate. The resulting liquid ferric sulfate produced in accordance with the process of the invention generally comprises about 12% trivalent iron.

BRIEF DESCRIPTION OF THE DRAWING

The attached drawing illustrates the invention with claimed improvements. In particular, the drawing illustrates the junctures of the polymer addition and the reclaim (scrubber) tank.

DETAILED DESCRIPTION OF THE INVENTION

In the improved process for the production of liquid ferric sulfate using finely-divided iron ore, sulfuric acid and water in accordance with the invention the ferric sulfate produced contains little if any insoluble material and the product is ideal for use in waste water treatment processes because there is substantially no extraneous material to form sludge. Not only is the sludge removal problem essentially eliminated but the user is relieved of payment for useless filler material. In the invention purification of the product is enhanced by the introduction of a suitable polymeric settling agent which aids in the removal of undissolved iron fines if any from the digester output. Additionally, in accordance with the invention the yield is improved by recycling the waste streams from the reactor in a direction countercurrent to, and through, the dilution water. The reaction is maintained at a temperature which can range from about 130 degrees. C. to about 150 degrees C. It is desirable that the reaction temperature remain within a range from about 135 degree. C. to about 145 degree C. and more preferable if it is maintained at or near 140 degree. C. A pressure of about 35 psi is preferred. The process requires from about 4 to 8 hours of reaction temperature and pressure, and the mixture is preferable agitated during the digestion process to ensure complete reaction.

In the preferred embodiment of this invention, finely-divided iron ore having an average particle size of about 50 microns and having a ferric oxide content of about 98% is combined with water and a sulfuric acid of about 93% conc. in a closed reaction chamber. However, the iron ore may contain as little as 85% total iron, and less concentrated may be used as long as the total acid present is in sufficient quantity to react with the iron ore. It is apparent that lower concentrations of iron and sulfuric acid would result in a slower reaction rate and might not produce sufficient heat of reaction to be self-sustaining, i.e. additional external energy would probably be required to get the mixture to reaction temperature and pressure.

The materials used in the deriving optimum results in accordance with the invention are commercially available. Finely-divided iron ore containing about 98% ferric oxide is commercially available and may be obtained, for example, from Densitech under the tradename Densimix. This particular material contains about 66% (ferric) iron (and about 32% ferrous iron), and the particle size is less than about 20 microns which facilitates reaction with the sulfuric acid. The concentrated (92–95%) sulfuric acid employed in producing the invention is available from a variety of suppliers; e.g., Phelps Dodge sells $H_2SO_4$ which has a concentration of approximately 93%.

The weight ratio of the ingredients will range from about 17 to about 27% and preferably about 20% ferric oxide: 31 to 41 and preferably about 35% $H_2SO_4$: 37 to 47 preferably about 45% $H_2O$ A preferred range of weight ratios is from about 20 to 24% ferric oxide; 34 to 38% $H_2SO_4$ and 40 to 44% $H_2O$. An especially preferred weight ratio is about 22% ferric oxide, 36% sulfuric acid and 42% water. The closed reaction chamber will preferably be heated to about 140. Degree. C. and the pressure will be held at about 35 psi for at least about 4 hours at reaction temperature while the mixture is agitated. When digestion is complete, the liquid ferric sulfate is quickly cooled to prevent undesired hydration, filtered and diluted, if necessary, to yield a solution having about 10% trivalent iron.

The temperature of the reaction should be kept at about 140.degree. C. for best results, although a variance of 10.degree. C. either way will not significantly affect the final product. The pressure in the reaction chamber should be maintained at about 35 psi, but it can vary from about 30 to 40 psi without deleterious effects. Reactions outside these temperature and pressure ranges tend to produce divalent iron or hydrated complex sulfur compounds, $Fe2(SO_4)_3$, $5H20$ instead of trivalent iron.

When the process is complete, the pressure relief valve in the reaction chamber is opened to reduce the pressure and lower the temperature. It is preferable to cool the hot liquid ferric sulfate as quickly a practical to prevent undesired hydration of the ferric sulfate. Cooling can be accelerated by flowing cold water through the heating coils. Before entering a storage tank, the liquid preferably passes through a filter media to remove any undigested solid particles.

The liquid ferric sulfate produced by this invention contains up to about 12% trivalent iron. Since most commercial operations use solutions of about 10% trivalent iron, the liquid ferric sulfate is readily diluted with a predetermined amount of water which can be easily calculated by a person or ordinary skill in the art based on the specific gravity of the ferric sulfate solution.

The rate at which the temperature increases during start-up is important because of the danger of a runaway reaction. A preferred rate of increase is about 5.degrees. C. every 15 minutes until the reaction temperature of about 140.degree.C. is reached. The rate of temperature decreases at the end of the reactions also important, although not as critical as temperature increase during start-up. The liquid ferric sulfate should be cooled as quickly as practical because prolonged heating could drive the reaction past the desired end point and produce hydrated complex sulfur compounds. It is preferred that the temperature of the liquid ferric sulfate be reduced to about 75.degree.C. within about 4 hours after the reaction is completed. The entire process from start-up to cool-down will typically be less than 12 hours, not including the time required to fill and empty the reaction chamber.

The process flow for the improved liquid ferric sulfate manufacture will be apparent from the foregoing and the details thereof more fully clarified by a reference to the flow diagram and the example hereunder.

By the way of example and not limitations, the following serves to further illustrate the invention in its preferred embodiment.

EXAMPLE

Into a closed reaction chamber was pumped 26,500 liters of water, followed by 32,000 pounds of Densimix (98%) total ferric oxide). Next, 13,012 liters of concentrated (93%) sulfuric acid was added, and the temperature of the mixture rose to 83.degree.C. from the heat of reaction. The temperature of the mixture was controlled so as to increase the temperature at a rate of about 5.degree.C. every 15 minutes by use of indirect heat exchange using a schotchmatic 250 horsepower boiler. When the temperature was at approximately 140.degree.C. and pressure was about 32 psi, the heat source, i.e. the boiler, was turned off and the reaction proceeded on its own. The time from start-up to reaction temperature and pressure was about 2.5 hours. The temperature of the mixture at one point rose to about 147.degree.C., at a pressure of about 34 psi. The pressure release valve was opened to reduce temperature, and the reaction temperature dropped to about 143.degree.C. at 34 psi. At about 4.5 hours after reaction temperature was reached, a sample tested at 11.53% trivalent iron. The reaction was stopped by slowly releasing pressure and circulating cold water through the heating coils. When the temperature had declined to about 100.degree.C. at atmospheric pressure, the liquid sulfate was pumped through a filter media and heat exchanged to about 75.degree.C. before it entered the dilution tank. The volume of liquid ferric sulfate totaled 43,069 liters. It was diluted with 6,589 liters of water to produce a solution having about 10% trivalent iron. When a solution of about 12% trivalent iron is desired, this final dilution is omitted.

In accordance with the invention, the product throughput of the process is increased and the quality of the final product is improved by the addition of a small but effective amount, e.g., of the order of 0.0000012% to about 0.0000048% based on the weight of ferric oxide, of a polymeric settling aid. Any variety of suitable polymeric materials may be used. Amounts of the polymeric settling acid can vary considerably from a quantity as little as 0.1% to as high as 50% based on the ferric oxide, although practical consideration would usually preclude amounts in excess of about 10%. Cationic polymers as a class are desirable and most preferably is cationic polyacryamide. We have also discovered that the yield is marked by improved hydroversing a portion of the reactor heel to a tank ("Scrubber") with water for the following batch being passed through this heel on the way to the reactor. This has the beneficial effects of improving overall yield from the iron ore and minimizes the environmental impact of unreacted material by keeping it to a minimum. By monitoring the specific gravity in the reactor, adjustments can be made to assure consistent results even with variations in ore quality and scrubber recovery.

The principle aspects of the invention and the best mode in which it is contemplated to apply that principle have been described. It is to be understood that details provided in the foregoing are illustrative only and that other means and techniques can be employed without departing from the true scope of the invention as described in the following claims.

What is claimed is:

1. In a process for making aqueous ferric sulfate solution that involves:
   (a) combining in a closed reaction vessel a mixture of finely-divided ferric oxide, concentrated sulfuric acid and water;
   (b) heating said mixture to a reaction temperature of from about 130° C. to about 150° C. and, at a pressure of from about 30 PSI to about 40 PSI while agitating said mixture and while controlling the rate of temperature increase at about 5° C. per fifteen minutes;
   (c) maintaining said mixture at a digestion temperature ranging from about 130° C. to about 150° C. and a pressure ranging from about 30 PSI to about 40 PSI for a period ranging up to from about three to eight hours while continuing said agitation;
   (d) lowering the temperature and pressure of said mixture; and
   (e) collecting said aqueous ferric sulfate solution as a product of the process, the improvement comprising water scrubbing waste gas from the reaction vessel and recycling the scrubbing water to the digestion process of step (c).

2. The process of claim 1 wherein the waste gas from the reaction vessel is recycled countercurrent through the scrubbing water.

3. The process of claim 1 wherein an effective amount of a polymeric settling agent is introduced into the product of the process to aid in removal of residual iron fines.

4. The process of claim 1, wherein said sulfuric acid has a concentration of about 93%.

5. The process of claim 1, wherein said mixture comprises about 20 weight percent ferric oxide, about 35 weight percent concentrated sulfuric acid, and about 45 weight percent water.

6. The process of claim 1 wherein the average particle size of said ferric oxide is less than about 50 microns.

7. The process of claim 6 wherein removal of unreacted iron fines is aided by adding a polymeric settling agent to the product of step (e).

8. The process of claim 7 wherein the polymeric settling agent is a cationic polyacylamide.

9. The process of claim 1 wherein from about 0.000012% to about 0.000048% based on the weight of the ferric oxide of a polymeric agent is introduced into the product of the process to aid in the removal of residual unreacted iron fines.

10. The process of claim 9 wherein the polymeric settling agent is a cationic polyacrylamide.

* * * * *